(12) United States Patent
Abedini et al.

(10) Patent No.: US 9,886,758 B2
(45) Date of Patent: Feb. 6, 2018

(54) ANNOTATION OF SKIN IMAGE USING LEARNED FEATURE REPRESENTATION

(71) Applicant: INTERNATIONAL BUSINESS MACHINES CORPORATION, Armonk, NY (US)

(72) Inventors: Mani Abedini, Melbourne (AU); Rajib Chakravorty, Melbourne (AU); Rahil Garnavi, Melbourne (AU); Munawar Hayat, Melbourne (AU)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 117 days.

(21) Appl. No.: 15/086,988

(22) Filed: Mar. 31, 2016

(65) Prior Publication Data
US 2017/0287134 A1    Oct. 5, 2017

(51) Int. Cl.
| | | |
|---|---|---|
| *G06K 9/00* | (2006.01) | |
| *G06T 7/00* | (2017.01) | |
| *G06K 9/62* | (2006.01) | |

(52) U.S. Cl.
CPC ............ *G06T 7/0014* (2013.01); *G06K 9/622* (2013.01); *G06T 7/0081* (2013.01); *G06T 7/0089* (2013.01); *G06T 2207/10056* (2013.01); *G06T 2207/20081* (2013.01); *G06T 2207/20116* (2013.01); *G06T 2207/20148* (2013.01); *G06T 2207/30088* (2013.01); *G06T 2207/30096* (2013.01)

(58) Field of Classification Search
CPC ... G06T 7/0014; G06T 7/0081; G06T 7/0089; G06T 2207/10056; G06T 2207/20081; G06T 2207/20116; G06T 2207/20148; G06T 2207/30088; G06T 2207/30096; G06K 9/622
See application file for complete search history.

(56) References Cited

U.S. PATENT DOCUMENTS

| | | | |
|---|---|---|---|
| 9,286,537 B2* | 3/2016 | Radha Krishna | |
| | | Rao ..................... | G06K 9/4604 |
| 2014/0036054 A1* | 2/2014 | Zouridakis ............ | G06T 7/0012 |
| | | | 348/77 |
| 2014/0286561 A1* | 9/2014 | Remiszewski ..... | G06K 9/00127 |
| | | | 382/133 |

(Continued)

OTHER PUBLICATIONS

Ozkan, Mehmet, Benoit M. Dawant, and Robert J. Maciunas. "Neural-network-based segmentation of multi-modal medical images: a comparative and prospective study." IEEE transactions on Medical Imaging 12.3 (1993): 534-544.*

*Primary Examiner* — Shefali Goradia
(74) *Attorney, Agent, or Firm* — F. Chau & Associates, LLC (57) ABSTRACT

A method for annotation of skin images includes receiving a plurality of dermatoscopic images. Each of the dermatoscopic includes a region of lesion skin and a region of normal skin. A first convolutional neural network is trained according to an interior of the region of lesion skin using each of the plurality of dermatoscopic images. A second convolutional neural network is trained according to a boundary between the region of lesion skin and the region of normal skin. An additional dermatoscopic image is acquired. The first and second convolutional neural networks are used to identify a region of lesion skin within the acquired additional dermatoscopic image.

20 Claims, 6 Drawing Sheets

(56) References Cited

U.S. PATENT DOCUMENTS

| | | | |
|---|---|---|---|
| 2015/0106117 A1* | 4/2015 | Ananda | G06F 19/3487 705/3 |
| 2016/0171682 A1* | 6/2016 | Abedini | G06T 7/0012 382/132 |
| 2017/0228616 A1* | 8/2017 | Tasdizen | G06K 9/6256 |

* cited by examiner

ANNOTATION OF SKIN IMAGE USING LEARNED FEATURE REPRESENTATION

BACKGROUND

1. Technical Field

The present disclosure relates to annotation of skin images and, more specifically, to systems and methods for the annotation of skin images using learned feature representation.

2. Discussion of Related Art

Dermatoscopy is a process by which skin lesions are examined, generally under magnification. Dermatoscopy may be performed with a traditional magnifying apparatus or a digital apparatus. Digital dermatoscopy images may be analyzed by a machine to aid medical practitioners in the identification and characterization of various skin lesions.

Where digital analysis is performed, a computer attempts to match the characteristics of the lesion with sets of features that are indicative of various diagnoses. These features are hand-crafted, which is to say, they are manually programmed with the aid of a human expert, to identify characteristics known by the human expert to be indicative of a particular diagnosis.

After the hand-crafted features are constructed, various medical imaging techniques such as gradient vector flow (GVF), level set methods, adaptive thresholding, adaptive snake, EM level set, and fuzzy-based split and merging techniques may be used to characterize the lesion.

BRIEF SUMMARY

A method for annotation of skin images includes receiving a plurality of dermatoscopic images. Each of the dermatoscopic includes a region of lesion skin and a region of normal skin. A first convolutional neural network is trained according to an interior of the region of lesion skin using each of the plurality of dermatoscopic images. A second convolutional neural network is trained according to a boundary between the region of lesion skin and the region of normal skin. An additional dermatoscopic image is acquired. The first and second convolutional neural networks are used to identify a region of lesion skin within the acquired additional dermatoscopic image.

Training the first convolutional neural network according to the interior of the region of lesion skin using each of the plurality of dermatoscopic images may include preprocessing each of the plurality of dermatoscopic images, converting the preprocessed images into arrays of super pixels, extracting windows at centroids of each of the super pixels of each of the converted preprocessed images, performing class-imbalance removal on each of the super pixels of each of the converted preprocessed images, and training the first convolutional neural network based on the extracted windows and class-imbalance removed images.

Converting the preprocessed images into arrays of super pixels may be performed using simple linear iterative clustering (SLIC).

Preprocessing each of the plurality of dermatoscopic images may include removing noise and extraneous characteristics therefrom.

Performing class-imbalance removal may include generating synthetic examples for normal skin by using synthetic minority over sampling techniques (SMOTE).

Training the second convolutional neural network according to the boundary between the region of lesion skin and the region of normal skin may include preprocessing each of the plurality of dermatoscopic images, filtering each of the preprocessed images, extracting boundaries from each of the filtered images, extracting windows at boundary points along the extracted boundaries for each of the filtered images, and training the second convolutional neural network based on the extracted windows of the boundary points along the extracted boundaries for each of the filtered images.

Using the first and second convolutional neural networks to identify a region of lesion skin within the acquired additional dermatoscopic image may include preprocessing the acquired additional dermatoscopic image, converting the preprocessed image into an array of super pixels, and using a conditional random field model and the first and second convolutional neural networks for super pixel-level labeling of the converted additional dermatoscopic image.

Using the conditional random field model and the first and second convolutional neural networks for super pixel-level labeling of the converted additional dermatoscopic image may include generating a probability map of the converted additional dermatoscopic image in which, for each pixel, a probability of satisfying each of the first and second convolutional neural networks is represented, and defining pair-wise potentials for the conditional random field model in terms of an edge map of the converted additional dermatoscopic image.

The additional dermatoscopic image may be acquired using a dermatoscope.

The additional dermatoscopic image may be displayed with the identified region of lesion skin highlighted therein.

The identified region of lesion skin may be analyzed to determine a diagnosis for the identified region of lesion skin.

A dermatoscope includes an image capture device for acquiring a dermatoscopic image in digital form. An image processor applies a first and a second convolutional neural network to the acquired dermatoscopic image and identifying a region of lesion skin within the acquired dermatoscopic image based on results of the application of the first and second convolutional neural networks. A display device displays the acquired dermatoscopic image with the identified region of lesion highlighted therein. The first convolutional neural network is trained according to an interior of regions of lesion skin within a plurality of training dermatoscopic images. The second convolutional neural network is trained according to a boundary between the regions of lesion skin and regions of normal skin within the plurality of training dermatoscopic images.

A biopsy removal tool may be included to remove a sample of the identified region of lesion. The biopsy removal tool may be a needle, punch, scissor or blade.

Training the first convolutional neural network according to the interior of the region of lesion skin using each of the plurality of training dermatoscopic images may include preprocessing each of the plurality of training dermatoscopic images, converting the preprocessed images into arrays of super pixels, extracting windows at centroids of each of the super pixels of each of the converted preprocessed images, performing class-imbalance removal on each of the super pixels of each of the converted preprocessed images, and training the first convolutional neural network based on the extracted windows and class-imbalance removed images.

Training the second convolutional neural network according to the boundary between the region of lesion skin and the region of normal skin may include preprocessing each of the plurality of training dermatoscopic images, filtering each of the preprocessed images, extracting boundaries from each of the filtered images, extracting windows at boundary points along the extracted boundaries for each of the filtered images, and training the second convolutional neural network based on the extracted windows of the boundary points along the extracted boundaries for each of the filtered images.

The image processor may be configured for preprocessing the acquired dermatoscopic image, converting the preprocessed image into an array of super pixels, and using a conditional random field model and the first and second convolutional neural networks for super pixel-level labeling of the converted additional dermatoscopic image.

A method for annotation of skin images includes receiving a first convolutional neural network that has been trained according to an interior of a region of lesion skin using each of a plurality of dermatoscopic training images. A second convolutional neural network that has been trained according to a boundary between the region of lesion skin and the region of normal skin in each of the plurality of dermatoscopic training images is received. A clinical dermatoscopic image is acquired. The received first and second convolutional neural networks are used to identify a region of lesion skin within the acquired clinical dermatoscopic image.

Using the first and second convolutional neural networks to identify a region of lesion skin within the acquired clinical dermatoscopic image may include preprocessing the acquired clinical dermatoscopic image, converting the preprocessed image into an array of super pixels, and using a conditional random field model and the first and second convolutional neural networks for super pixel-level labeling of the converted additional dermatoscopic image.

Using the conditional random field model and the first and second convolutional neural networks for super pixel-level labeling of the converted clinical dermatoscopic image may include generating a probability map of the converted clinical dermatoscopic image in which, for each pixel, a probability of satisfying each of the first and second convolutional neural networks is represented, and defining pair-wise potentials for the conditional random field model in terms of an edge map of the converted clinical dermatoscopic image.

BRIEF DESCRIPTION OF THE SEVERAL VIEWS OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION

In describing exemplary embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

Exemplary embodiments of the present invention relate to systems and methods for automatically annotating skin images using learned feature representation. By relying upon learned feature representation, features may be generated more accurately, with greater efficiency, and without the need for human experts to hand-craft features.

Moreover, exemplary embodiments of the present invention may utilize two distinct sets of convolutional neural networks (CNN) to perform the automated identification. The first set of CNNs is designed to learn feature representations for interior regions of the lesion, while the second set of CNNs is designed to learn feature representations for boundary regions in which the lesion meets normal skin. These learnt features may then be used by any classifier, to generate probability outputs for a region of a dermatoscopic image that indicate either normal or lesion skin, or otherwise diagnose a type of the lesion.

Exemplary embodiments of the present invention may perform this diagnosis by dividing the image into sections or pixels and then labeling ("annotating") each section/pixel as, for example, "normal skin" or "lesion skin." However, exemplary embodiments of the present invention are not limited to annotating sections/pixels as either normal or lesion, exemplary embodiments of the present invention may also be used for other purposes such as segmentation of symmetry regions from normal skin, segmentation of asymmetry regions from normal skin, segmentation of pigment network regions from normal skin, segmentation of blotches from normal skin, segmentation of dots/globules from normal skin, and segmentation of dermatoscopic features such as: pigment network, amorphous structureless areas (blotches), leaf-like areas, blue ovoid masses, milia-like cysts, fissures and comedo-like openings, blood vessels, etc.

For this purpose, first a convolutional neural network (CNN) architecture may be defined which contains, for example, three alternating convolution and sub-sampling layers followed by two fully connected layers. The two CNNs are then separately trained (using the defined architecture) to learn features from (1) full skin or lesions, and (2) the boundary regions which separate the normal skin from lesions, respectively.

Thus exemplary embodiments of the present invention may utilize deep learning features jointly with a conditional random filed (CRF) model for smooth section/pixel-level labelling of dermatoscopy images. Alternatively, or additionally, other graph-based smoothing models such as Graph Cut may be used.

After a lesion has been identified and its boarders known, exemplary embodiments of the present invention may continue on to determine what type of lesion it is and whether the identified lesion is cancerous or another potential health risk.

While exemplary embodiments of the present invention are described herein with reference to dermatoscopy, the present invention is not limited in its application to dermatoscopy, and the approaches described herein may be applied to other aspects of medical imaging such as clinical images.

Figure 1:
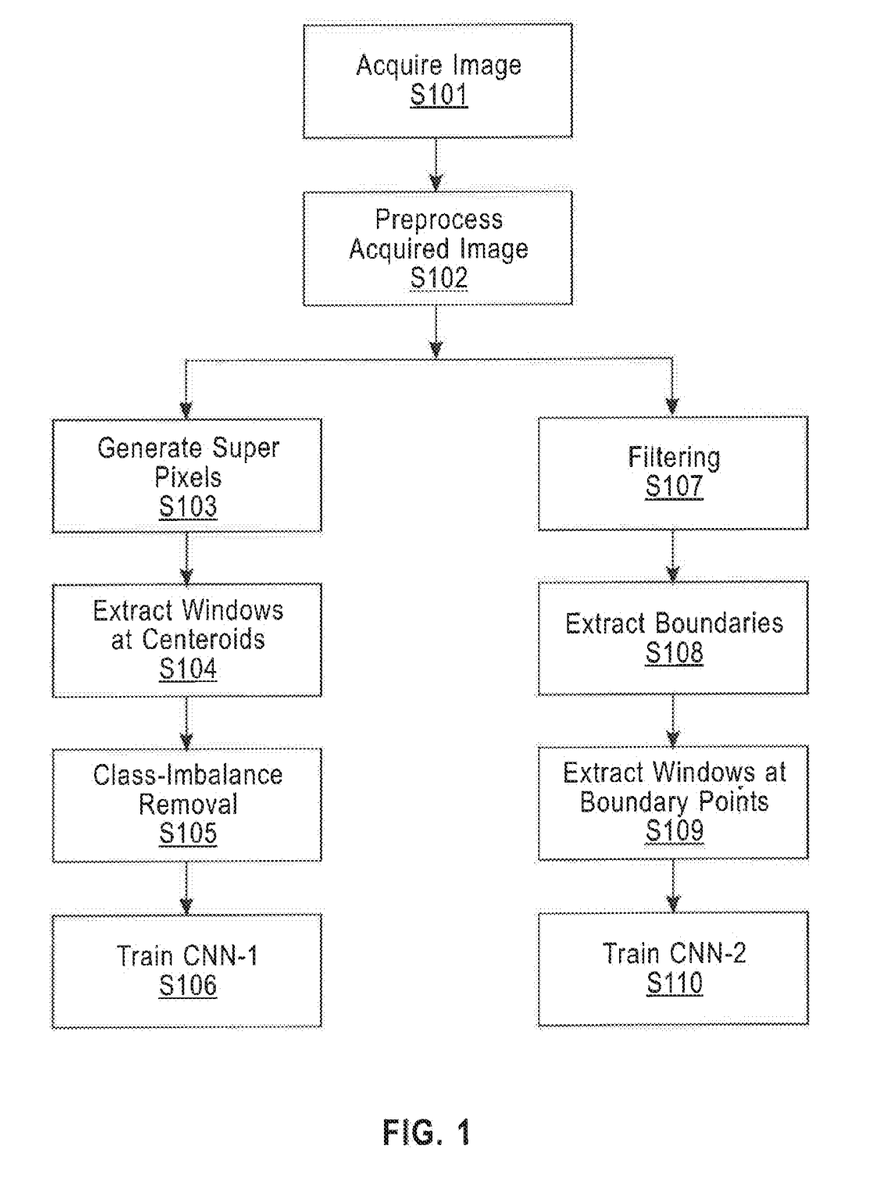
FIG. 1 is a flow chart illustrating an approach for the annotation of skin images using learned feature representation in accordance with exemplary embodiments of the present invention.

FIG. 1 is a flow chart illustrating an approach for the annotation of skin images using learned feature representation in accordance with exemplary embodiments of the present invention. First an image is acquired (Step S101). The image may be acquired, for example, using a dermatoscope which may be a digital dermatoscope acquiring a digital image. The dermatoscope image, so acquired, may then be pre-processed (Step S102). Pre-processing may be used to remove noise from the image, as well as hair and other extraneous image data and/or artifacts. Pre-processing may also modify the acquired image, for example, by altering contrast, color, etc. for optimal handling.

After image pre-processing, the pre-processed image may then be divided into "super pixels" (Step S103). Super pixels are blocks of image data, larger than the size of a single pixel, and still small enough to represent a field of the image that is substantially homogeneous, or can be treated as homogenous without adversely affecting feature generation/recognition. Super pixels may be generated, for example, using methods such as simple linear iterative clustering (SLIC).

Next, rectangles may be fitted around the centroid of each super pixel to form an image patch window (Step S104). These image patches may then be resized to fit predetermined pixel dimensions such as 96×96 pixels. However, there may be a resulting imbalance between image patches of normal skin and image patches of a lesion, and this imbalance may adversely affect image patch comparison. Accordingly, exemplary embodiments of the present invention may thereafter perform class imbalance removal (Step S105). Class imbalance removal may include the generation of synthetic examples for the minority class (e.g. normal skin) by using synthetic minority over sampling techniques (SMOTE). Then, a first convolutional neural network ("CNN-1") may be trained to learn feature representations for image patches containing regions from normal or lesion skin (Step S106). Thus because the training is based on these substantially homogenous super pixels, CNN-1 is able to distinguish between interior areas of normal and lesion skin.

The pre-processed image may also be filtered to remove small outlying areas and to otherwise increase contrast between what is and what is not the lesion skin (Step S107). From there, a boundary of the lesion skin may be extracted (Step S108). Because of the filtering, the extracted boundary may include a singular contiguous shape, however, this need not be the case, as there may be multiple separate regions of lesion skin within the image.

After the boundary has been extracted, rectangles may be fitted to extract windows by walking along the extracted boundary (Step S109) in a process similar to that discussed above for step S104. However, in this step, the windows are extracted along the boundary points to capture the qualities of the boundaries and contours. The second convolutional neural network ("CNN-2") may then be trained to learn feature representations for image patches along the boundaries and contours (Step S110).

Figure 2:
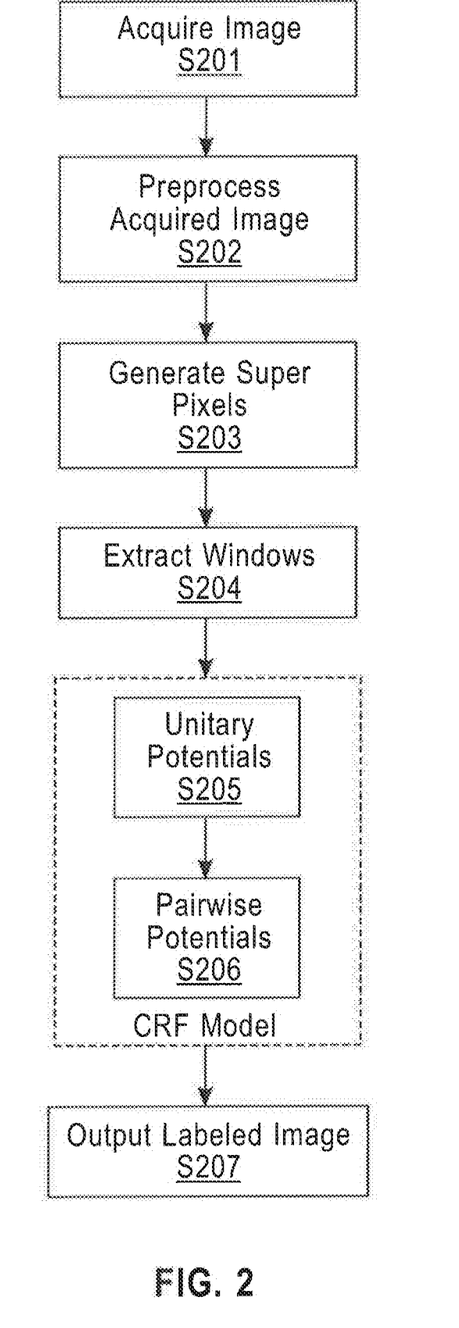
FIG. 2 is a flow chart illustrating an approach for automatically labeling a dermatoscopic image in accordance with exemplary embodiments of the present invention.

Once the two convolutional neural networks have been trained, and the features learned, a dermatoscopic image may be automatically labeled using the CNNs/features. FIG. 2 is a flow chart illustrating an approach for automatically labeling a dermatoscopic image in accordance with exemplary embodiments of the present invention. According to this approach, an arbitrary dermatoscopic image patch may be represented in terms of activations of the trained networks. First, a dermatoscopic image may be acquired (Step S201). Thereafter, the image may be pre-processed, for example, in the manner discussed above (Step S202). Super pixels may then be generated from the preprocessed image (Step S203). The image may thereafter be represented, for example, as an array of 96×96 substantially homogenous blocks. Patches may again be extracted for each super pixel (Step S204), however, the correspondence between super pixels and patches need not be one-to-one as a patch may cover more than one super pixels and a given super pixel may be part of more than one patch. These patches may then be fed into each of the two CNNs and probability values may be assigned for each patch from each CNN. A probability map may be generated for the 96×96 super pixels by, for each super pixel, averaging the probabilities for the constituent patches. This results in a pixel-level probability map of the image. The generation of the probability map is referred to herein as the establishment of the unitary potentials (Step S205).

Since this pixel-level probability map is generated from image patches, only the local spatial information will have been considered and information regarding the neighborhoods (neighboring patches) would not have been considered. The probability map might therefore not be very smooth. To smooth the labeled pixels, this probability map, which is a unary potential, is input to a conditional random field model (CRF). The pair-wise potentials for the CRF model are then defined in terms of the edge map of the input image (Step S206). The CRF model is now aware of both the local as well as the global spatial information since the unary term of the CNN model contains local information while the pair-wise term encodes the interactions between pixels.

Thus, the unary potentials of the CRF are defined as the posterior probabilities of the trained CNN models. The pair-wise potentials of the CRF are defined from the edge-maps (which may be generated, for example, by filtering followed by gradient operation). Inference may then be made to generate a smoothly labelled image (Step S207). The output labeled image may therefore be an image of 96×96 super pixels represented by the probabilities associated with each feature, for example, expressed as a 200-dimensional feature vector, as 200 images may have been used to train the features. However, as mentioned above, other graph-based smoothing techniques may be used instead of, or in addition to CFR. For example, Graph Cut techniques may be used.

Figure 3:
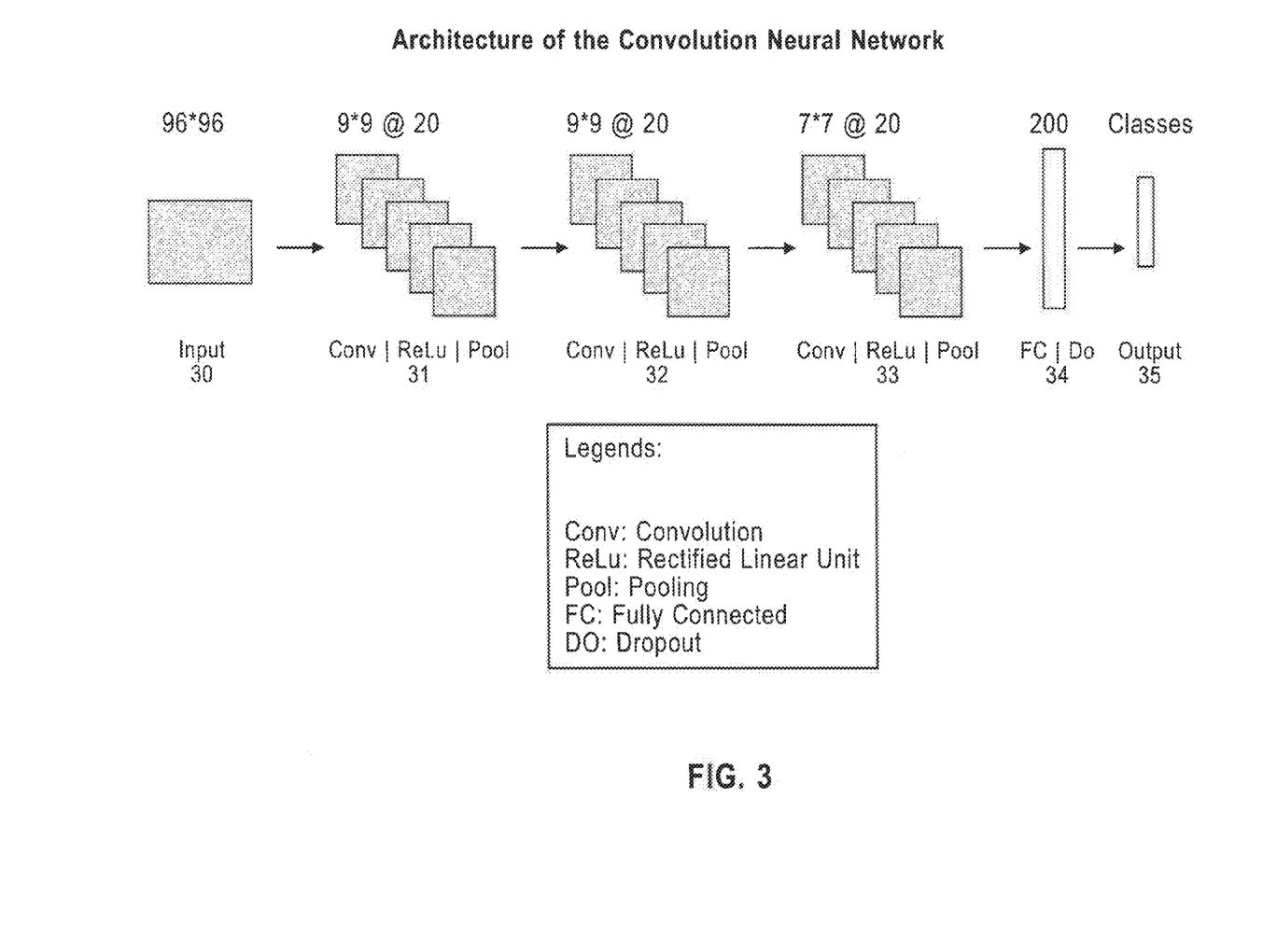
FIG. 3 is a diagram illustrating the representation of the image from acquired image to labeled output in accordance with exemplary embodiments of the present invention.

FIG. 3 is a diagram illustrating a possible architecture for convolutional neural networks ("CNN") that may be used in accordance with exemplary embodiments of the present invention. The input image 30 may be expressed as a 96×96 array of super pixels. The CNNs may include three alternating convolutional and sub-sampling layers 31, 32, and 33 (although this number is offered as an example, and there may be more or less layers depending on the properties of the images being processed) as well as two fully connected layers 34. The architecture, so defined, may be trained using stochastic gradient descent on the generated training image patches. To introduce robustness and to avoid overfitting, exemplary embodiments of the present invention may incorporate an l2-weight decay penalty, sparsity constraints and a dropout layer (with a dropout rate of 50%, for example) after the first fully connected layer (e.g. part of 34). The training may be performed for a total of, for example, 100 epochs, using an efficient GPU implementation to generate the output classes/features 35.

Figure 4:
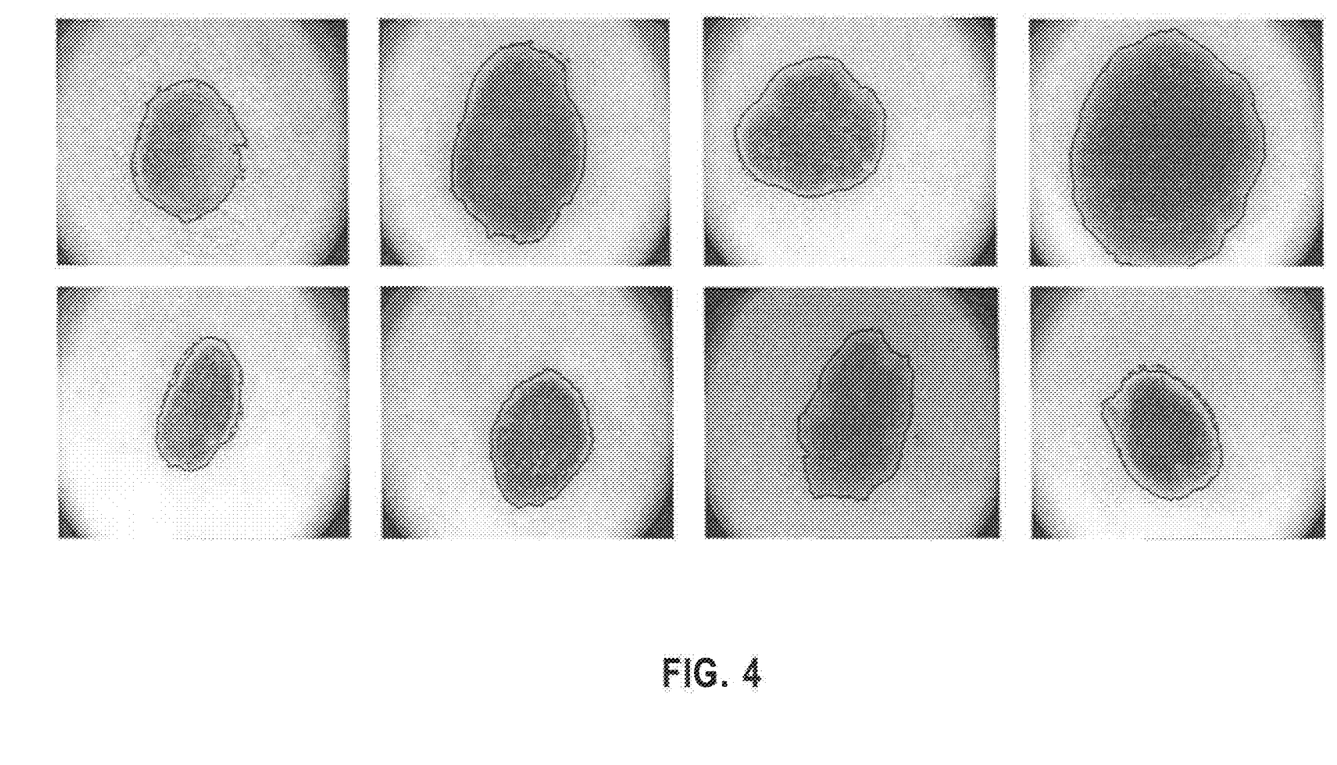
FIG. 4 is a set of pictures illustrating sample segmentation outputs in accordance with exemplary embodiments of the present invention.

FIG. 4 is a set of pictures illustrating sample segmentation outputs in accordance with exemplary embodiments of the present invention. As can be seen from these pictures, differentiation is clearly made between the region of lesion skin and the region of normal skin.

Figure 5:
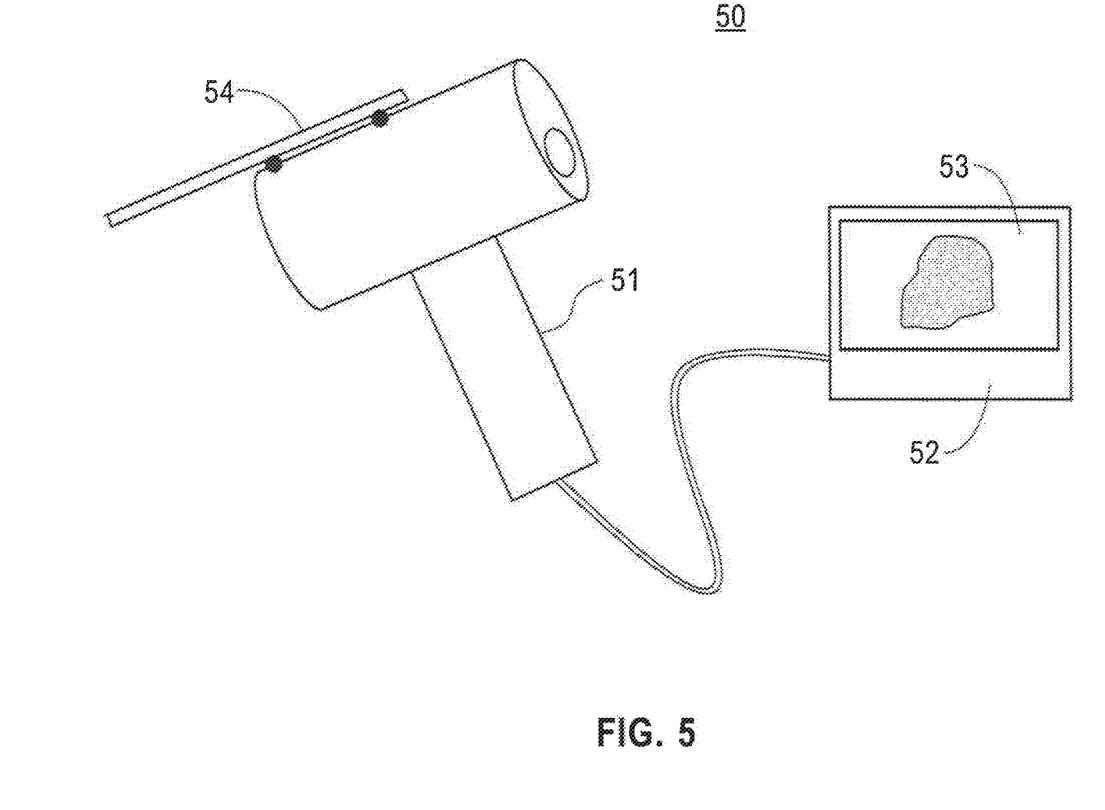
FIG. 5 is a diagram illustrating a specially equipped dermatoscope in accordance with exemplary embodiments of the present invention.

FIG. 5 is a diagram illustrating a specially equipped dermatoscope in accordance with exemplary embodiments of the present invention. The dermatoscope 50 may include an image capture device 51. The image capture device 51 may include a light source, an optical sensor, and according to some exemplary embodiments of the present invention, a containment region disposed between the optical sensor and the patient's skin for containing a medium such as a liquid. The image capture device 51 may be connected to an image processor 52 via a wired or wireless connection, or the image processor 52 may be incorporated into the image capture device 51.

The image processor 52 may include, for example, a graphics processing unit ("GPU") for processing the acquired clinical dermatoscopic image, as described in detail above. A display device 53 may also be included. The display device may be incorporated with either the image processor 52 (as shown) or the image capture device 51. The display device may be configured to display the resulting dermatoscopic image with the identified lesion region highlighted therein.

According to some exemplary embodiments of the present invention, the dermatoscope 50 may further include a biopsy removal tool 54. The biopsy removal tool 54 may include a biopsy needle, hole puncher, scissors, or blade for cutting and/or scraping. The dermatoscope 50 may be configured to automatically, or on the receiving of a command, biopsy a portion of the identified lesion skin using the biopsy removal tool 54 and the image capture device 51 for visual guidance.

Figure 6:
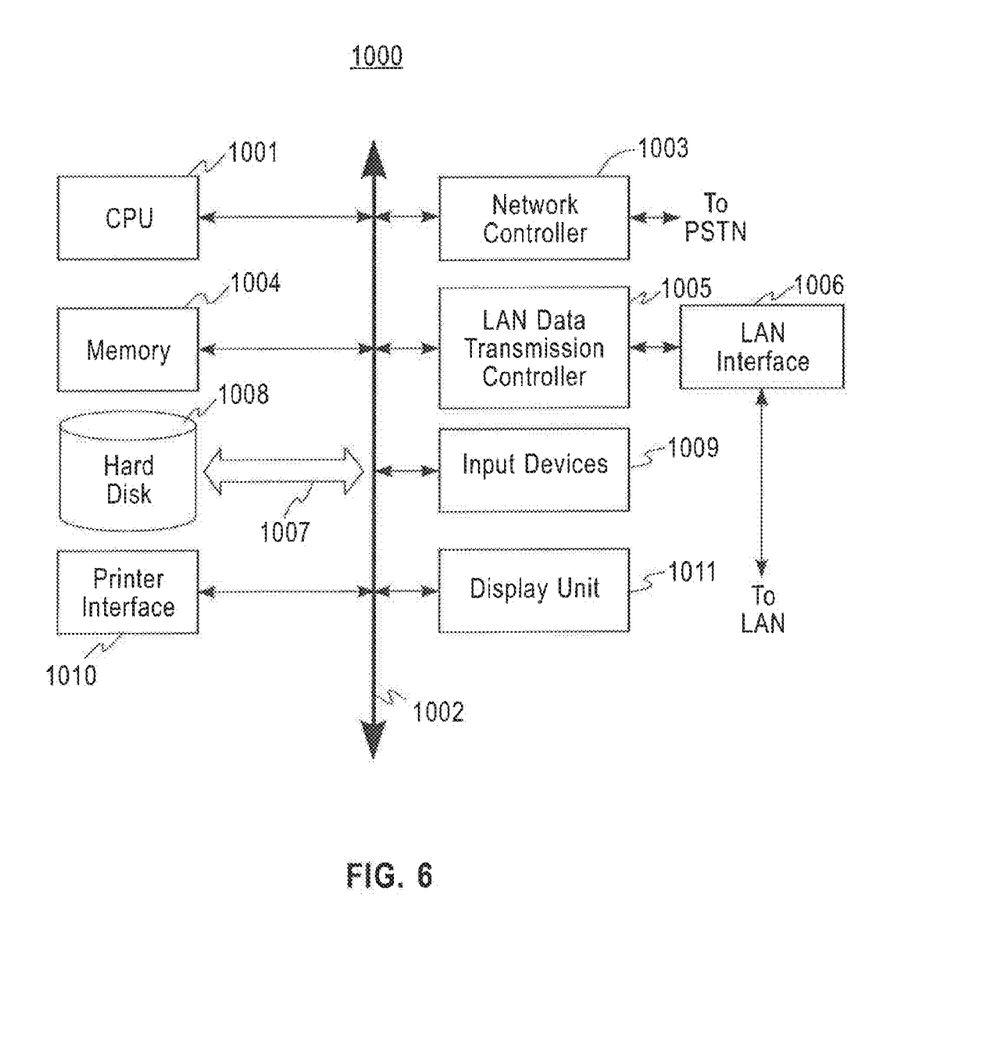
FIG. 6 shows an example of a computer system capable of implementing the method and apparatus according to embodiments of the present disclosure.

FIG. 6 shows an example of a computer system which may implement a method and system of the present disclosure. The system and method of the present disclosure may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk, 1008 via a link 1007.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Exemplary embodiments described herein are illustrative, and many variations can be introduced without departing from the spirit of the disclosure or from the scope of the appended claims. For example, elements and/or features of different exemplary embodiments may be combined with each other and/or substituted for each other within the scope of this disclosure and appended claims.

What is claimed is:

1. A method for annotation of skin images, comprising:
receiving a plurality of dermatoscopic images, each including a region of lesion skin and a region of normal skin;
training a first convolutional neural network according to an interior of the region of lesion skin using each of the plurality of dermatoscopic images;
training a second convolutional neural network according to a boundary between the region of lesion skin and the region of normal skin;
acquiring an additional dermatoscopic image; and
using the first and second convolutional neural networks to identify a region of lesion skin within the acquired additional dermatoscopic image.

2. The method of claim 1, wherein training the first convolutional neural network according to the interior of the region of lesion skin using each of the plurality of dermatoscopic images, comprises:
preprocessing each of the plurality of dermatoscopic images;
converting the preprocessed images into arrays of super pixels;
extracting windows at centeroids of each of the super pixels of each of the converted preprocessed images;
performing class-imbalance removal on each of the super pixels of each of the converted preprocessed images; and
training the first convolutional neural network based on the extracted windows and class-imbalance removed images.

3. The method of claim 2, wherein converting the preprocessed images into arrays of super pixels is performed using simple linear iterative clustering (SLIC).

4. The method of claim 2, wherein preprocessing each of the plurality of dermatoscopic images includes removing noise and extraneous characteristics therefrom.

5. The method of claim 2, wherein performing class-imbalance removal comprises generating synthetic examples for normal skin by using synthetic minority over sampling techniques (SMOTE).

6. The method of claim 1, wherein training the second convolutional neural network according to the boundary between the region of lesion skin and the region of normal skin, comprises:
preprocessing each of the plurality of dermatoscopic images;
filtering each of the preprocessed images;
extracting boundaries from each of the filtered images;
extracting windows at boundary points along the extracted boundaries for each of the filtered images; and
training the second convolutional neural network based on the extracted windows of the boundary points along the extracted boundaries for each of the filtered images.

7. The method of claim 1, wherein using the first and second convolutional neural networks to identify a region of lesion skin within the acquired additional dermatoscopic image, comprises:
preprocessing the acquired additional dermatoscopic image;
converting the preprocessed image into an array of super pixels; and
using a conditional random field model and the first and second convolutional neural networks for super pixel-level labeling of the converted additional dermatoscopic image.

8. The method of claim 7, wherein using the conditional random field model and the first and second convolutional neural networks for super pixel-level labeling of the converted additional dermatoscopic image, comprises:
generating a probability map of the converted additional dermatoscopic image in which, for each pixel, a probability of satisfying each of the first and second convolutional neural networks is represented; and
defining pair-wise potentials for the conditional random field model in terms of an edge map of the converted additional dermatoscopic image.

9. The method of claim 1, wherein the additional dermatoscopic image is acquired using a dermatoscope.

10. The method of claim 1, further comprising displaying the additional dermatoscopic image with the identified region of lesion skin highlighted therein.

11. The method of claim 1, further comprising analyzing the identified region of lesion skin to determine a diagnosis for the identified region of lesion skin.

12. A dermatoscope, comprising:
an image capture device for acquiring a dermatoscopic image in digital form;
an image processor for applying a first and a second convolutional neural network to the acquired dermatoscopic image and identifying a region of lesion skin within the acquired dermatoscopic image based on results of the application of the first and second convolutional neural networks; and
a display device for displaying the acquired dermatoscopic image with the identified region of lesion highlighted therein,
wherein the first convolutional neural network is trained according to an interior of regions of lesion skin within a plurality of training dermatoscopic images, and
wherein the second convolutional neural network is trained according to a boundary between the regions of lesion skin and regions of normal skin within the plurality of training dermatoscopic images.

13. The dermatoscope of claim 12, further including a biopsy removal tool for removing a sample of the identified region of lesion.

14. The dermatoscope of claim 13, wherein the biopsy removal tool is a needle, punch, scissor or blade.

15. The dermatoscope of claim 12, wherein training the first convolutional neural network according to the interior of the region of lesion skin using each of the plurality of training dermatoscopic images, comprises:
preprocessing each of the plurality of training dermatoscopic images;
converting the preprocessed images into arrays of super pixels;
extracting windows at centeroids of each of the super pixels of each of the converted preprocessed images;
performing class-imbalance removal on each of the super pixels of each of the converted preprocessed images; and
training the first convolutional neural network based on the extracted windows and class-imbalance removed images.

16. The dermatoscope of claim 12, wherein training the second convolutional neural network according to the boundary between the region of lesion skin and the region of normal skin, comprises:
preprocessing each of the plurality of training dermatoscopic images;
filtering each of the preprocessed images;
extracting boundaries from each of the filtered images;
extracting windows at boundary points along the extracted boundaries for each of the filtered images; and
training the second convolutional neural network based on the extracted windows of the boundary points along the extracted boundaries for each of the filtered images.

17. The dermatoscope of claim 12, wherein, the image processor performs the following:
preprocessing the acquired dermatoscopic image;
converting the preprocessed image into an array of super pixels; and
using a conditional random field model and the first and second convolutional neural networks for super pixel-level labeling of the converted additional dermatoscopic image.

18. A method for annotation of skin images, comprising:
receiving a first convolutional neural network that has been trained according to an interior of a region of lesion skin using each of a plurality of dermatoscopic training images;
receiving a second convolutional neural network that has been trained according to a boundary between the region of lesion skin and the region of normal skin in each of the plurality of dermatoscopic training images;
acquiring a clinical dermatoscopic image; and
using the received first and second convolutional neural networks to identify a region of lesion skin within the acquired clinical dermatoscopic image.

19. The method of claim 18, wherein using the first and second convolutional neural networks to identify a region of lesion skin within the acquired clinical dermatoscopic image, comprises:
preprocessing the acquired clinical dermatoscopic image;
converting the preprocessed image into an array of super pixels; and
using a conditional random field model and the first and second convolutional neural networks for super pixel-level labeling of the converted additional dermatoscopic image.

20. The method of claim 19, wherein using the conditional random field model and the first and second convolutional neural networks for super pixel-level labeling of the converted clinical dermatoscopic image, comprises:
generating a probability map of the converted clinical dermatoscopic image in which, for each pixel, a probability of satisfying each of the first and second convolutional neural networks is represented; and
defining pair-wise potentials for the conditional random field model in terms of an edge map of the converted clinical dermatoscopic image.

* * * * *